United States Patent [19]

Badalich

[11] 3,756,717
[45] Sept. 4, 1973

[54] SLIDE PROJECTOR

[75] Inventor: Frank C. Badalich, Chicago, Ill.

[73] Assignee: Bell & Howell Company, Chicago, Ill.

[22] Filed: May 10, 1971

[21] Appl. No.: 141,618

[52] U.S. Cl. .................. 353/21, 353/113, 353/118, 353/DIG. 1
[51] Int. Cl. ......................................... G03b 21/02
[58] Field of Search...................... 353/21, 113, 118, 353/DIG. 1

[56] References Cited
UNITED STATES PATENTS

| | | | |
|---|---|---|---|
| 2,594,162 | 4/1952 | Hartley | 353/113 |
| 3,146,666 | 9/1964 | Misuraca | 353/104 |
| 3,656,846 | 4/1972 | Hipelius | 353/112 |

*Primary Examiner*—Louis R. Prince
*Assistant Examiner*—Steven L. Stephan
*Attorney*—Griffin, Branigan & Kindness and William F. Pinsak

[57] ABSTRACT

This disclosure describes a slide projector having a slide transfer mechanism for moving slides from a slide supply tray, through slide preview and projection stations, to a slide storage tray. The transfer mechanism operates in either a forward or a reverse mode. A pair of yokes are moveable into and out of slide contact in accordance with the setting of face cams. The setting of the face cams is determined by the mode of operation of the projector. During slide movement, the yokes are moved into contact with the slides. While during return movement, the yokes are moved out of contact with the slides.

23 Claims, 17 Drawing Figures 3,756,717

SLIDE PROJECTOR

BACKGROUND OF THE INVENTION

This invention relates to slide projectors and more particularly to slide projectors having slide transfer mechanisms for moving slides through a projector upon command; the projector including a slide preview as well as a slide projection station.

Various types of slide projectors have been proposed and are in use. They vary from relatively uncomplicated structures wherein single slides are manually inserted and removed to complicated structures including means for automatically changing slides each time a trigger switch is activated.

While prior art projectors have found widespread use, they have various undesirable features. For example, the uncomplicated structures are difficult to operate in a normal slide projector environment, i.e., low light level conditions, because it is difficult to determine whether or not a slide is correctly oriented when it is inserted into the projector.

The more complicated structures have other disadvantages. For example, many of them do not have preview stations. Hence, if a slide is inverted in the slide supply tray, it is projected as an inverted picture. To correct such a condition, it is necessary that the mechanism be reversed and the slide inverted. Other undesirable features of automatic projectors lie in the mechanism that operates them. In general, these mechanisms are more complicated than desirable requiring a plurality of gears and cams operated by a motor. Hence, these mechanisms are subject to misalignment and failure.

Therefore, it is an object of this invention to provide a new and improved slide projector.

It is another object of this invention to provide a slide projector that automatically moves slides from a slide supply tray, through a slide preview station and a slide projection station, to a slide storage tray.

It is yet another object of this invention to provide an uncomplicated and, therefore, reliable slide projector that includes a slide transfer mechanism for moving slides through a slide preview station prior to projection, and operates in a reverse as well as a forward mode.

SUMMARY OF THE INVENTION

In accordance with principles of this invention, a slide projector having a slide transfer mechanism for moving slides from a slide supply tray, through slide preview and projection stations, to a slide storage tray is provided. The slide transfer mechanism includes yokes that are moveable into and out of slide contact positions. When in the slide contact position, a lateral movement mechanism moves the yokes and slides to the next "position". When out of the slide movement position, the lateral movement mechanism only moves the yokes and not the slides.

In accordance with another principle of this invention, the slide transfer mechanism can move slides in either a forward or a reverse direction.

In accordance with a further principle of this invention, two yokes are included and rotatably attached to a slide transfer frame. The slide transfer frame includes a slot. The slot is adapted to interact with a pin. The pin attached to a plate which is coupled to a gear. The gear causes movement of the plate and the slide transfer frame each time a relay is energized. In addition, a second relay controls whether or not the projector is operating in the forward or the reverse direction.

In accordance with a still further principle of this invention, face cams are mounted in the projector so as to coact with the yokes. The face cams cause rotation of the yokes toward or away from the slides in accordance with whether the projector is operating in the forward or the reverse direction.

It will be appreciated from the foregoing brief summary of the invention that a projector having a slide transfer mechanism that is relatively uncomplicated is provided. As opposed to utilizing a plurality of gears, the invention utilizes a relatively uncomplicated yoke and transfer frame mechanism to cause slide movement. In addition, because the invention includes a preview station, slides can be viewed prior to projection. Moreover, because the system operates in a reverse mode as well as a forward mode, a previously observed slide can be re-observed without requiring going through an entire slide tray before it can be re-observed.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
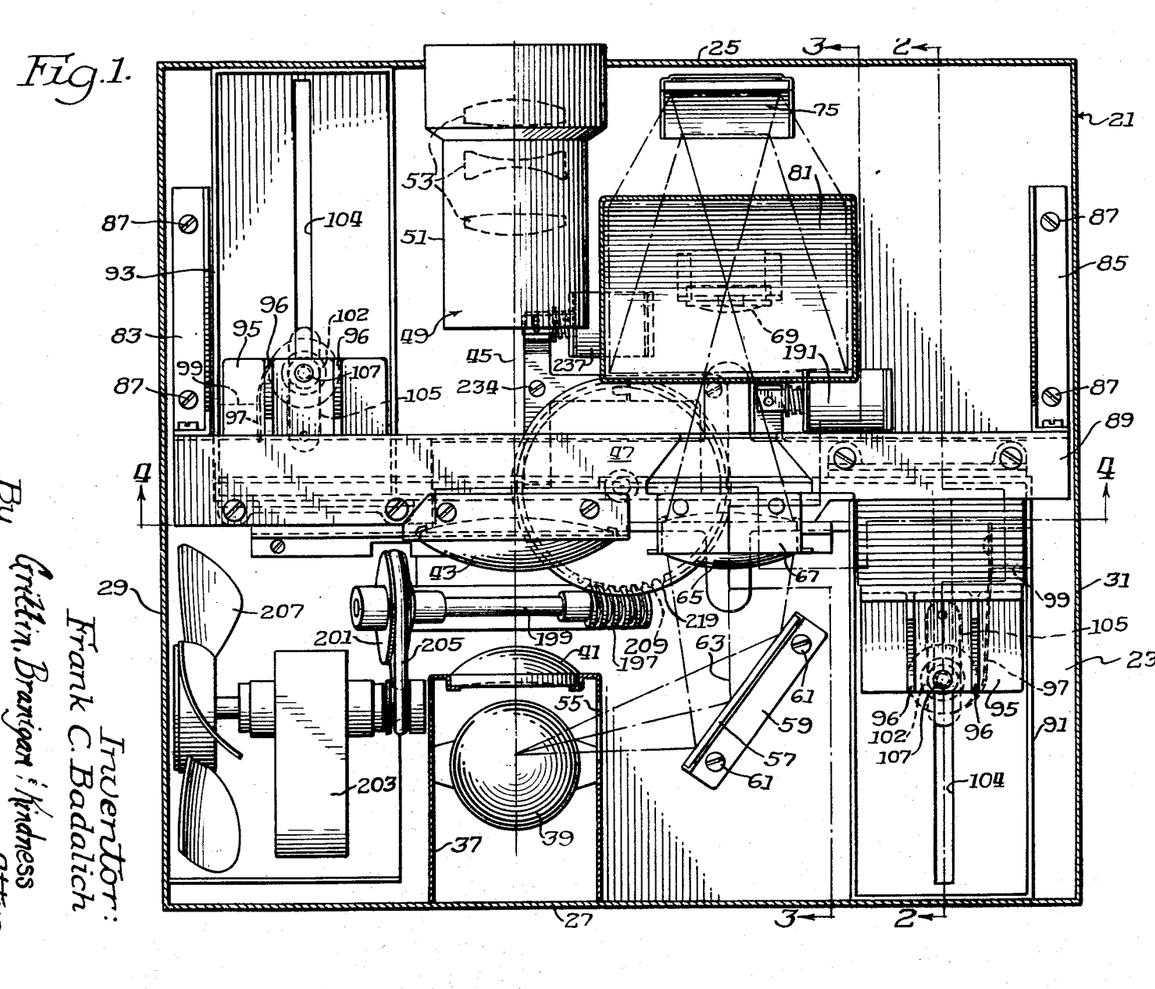
FIG. 1 is a horizontal sectional view of a slide projector according to a preferred embodiment of the present invention.

Turning now to the drawings wherein like reference numerals designate like parts throughout the several views, FIG. 1 illustrates a slide projector 21 which comprises a substantially rectangular casing 23 having front and rear walls 25 and 27 and side walls 29 and 31. The casing 23 also includes a base 33 (FIGS. 2 and 4) and a covering member of top 35. A chamber is thus defined within the casing 23.

A generally boxed shaped lamp housing 37 is attached to the rear wall 27 at a point intermediate the side walls 29 and 31. The lamp housing 37 housed a projection lamp 39. A pair of condensing lenses 41 and 43 (FIG. 1) are optically aligned with each other and with the lamp 39 along a projection axis 45, on one side of a slide track 47. A projection lens system 49 is located along the projection axis 45 on the other side of the slide track 47. The projection lens system 49 includes a barrel 51 that extends through the front wall 25. The barrel houses a plurality of lenses 53 (shown schematically by dashed lines in FIG. 1) for projecting a slide image in a conventional manner. The projection system including its lenses, may be of any conventional design, and, accordingly, is not further described herein.

The lamp housing 37 includes an aperture 55 located in one side (the right side as viewed in FIG. 1). Light from the lamp 39 passes through the aperture 55 and impinges on a first mirror or reflecting surface 57. The first mirror 57 is fixedly attached to a first mirror stand 59. The mirror stand is fixedly attached by any suitable means, such as bolts 61, to the base 33 of the casing 21 so that light from the lamp is reflected by the first mirror 57 along a preview station projection axis 63. The preview station projection axis 63 is parallel to the projection axis 45 as viewed in FIG. 1. A preview station condensing lens 65 held in a housing 67 (FIG. 3) is aligned along the preview station projection axis 63 on the same side of the slide track 47 as the condensing lenses 41 and 43 of the projection system.

A preview station projection lens 69 is located on the other side of the track 47. The preview station projection lens 69 is mounted in a support 71 fixedly attached to the base 33 by any suitable means, such as bolts 73 (FIG. 2), so as to project light from the lamp 49 onto a second mirror 75. The second mirror 75 is attached to a second mirror stand 77 which in turn is attached to the base 35 by any suitable means such as bolts 78. The second mirror 75 is mounted at a slight angle to the vertical so as to project light from the lamp 39 onto a screen 81 held in the top wall 35 of the casing 23 in the manner illustrated in FIGS. 2 and 3. As hereinafter described, light from the light source passes through a slide located at a preview station and through a slide at a projection station. A slide is first transferred from the supply, to the preview station, to the projection station, and to the storage station. Thus, a slide may be previewed prior to its being projected.

Two angle support elements 83 and 85 each having a strengthening rib along one edge are illustrated in FIG. 1. The angle support elements 83 and 85 each have one leg attached to the base 33 by any suitable means, such as bolts 87. The angle support elements are mounted parallel to and near the sides 21 and 23 so that they can support a generally U-shaped slide transfer mechanism frame 89 at right angles to the projection axis between the projection lens system 49 and the condensing lenses 41 and 43. The slide transfer mechanism frame 89 generally defines the slide track 47.

A slide supply magazine 91, generally in the form of a rectangular open topped box, has its rear attached to the rear wall 27 and its front supported by the slide transfer mechanism frame 89. Similarly, a slide storage magazine 93, also generally in the form of a rectangular open topped box, has its back attached to the front wall 25 and its front supported by the slide transfer mechanism frame 89. As hereinafter described, slides move from the supply magazine 91, through preview and projection stations, to the storage magazine 93. Both the supply and the storage magazines include slide pressure pads 95. The slide pressure pads 95 are generally right angled in cross section and include angular support ribs 96. The lower surface of the slide pressure pads rest on the bottoms of the supply and storage magazines 91 and 93. The upwardly projecting surfaces of the slide pressure pads 95 are pressed by the action of a negator spring 97 against the last or end slide of the plurality of slides that are held in the storage and supply magazines so as to force the slides toward the slide transfer mechanism frame 89.

Figures 2, 3:
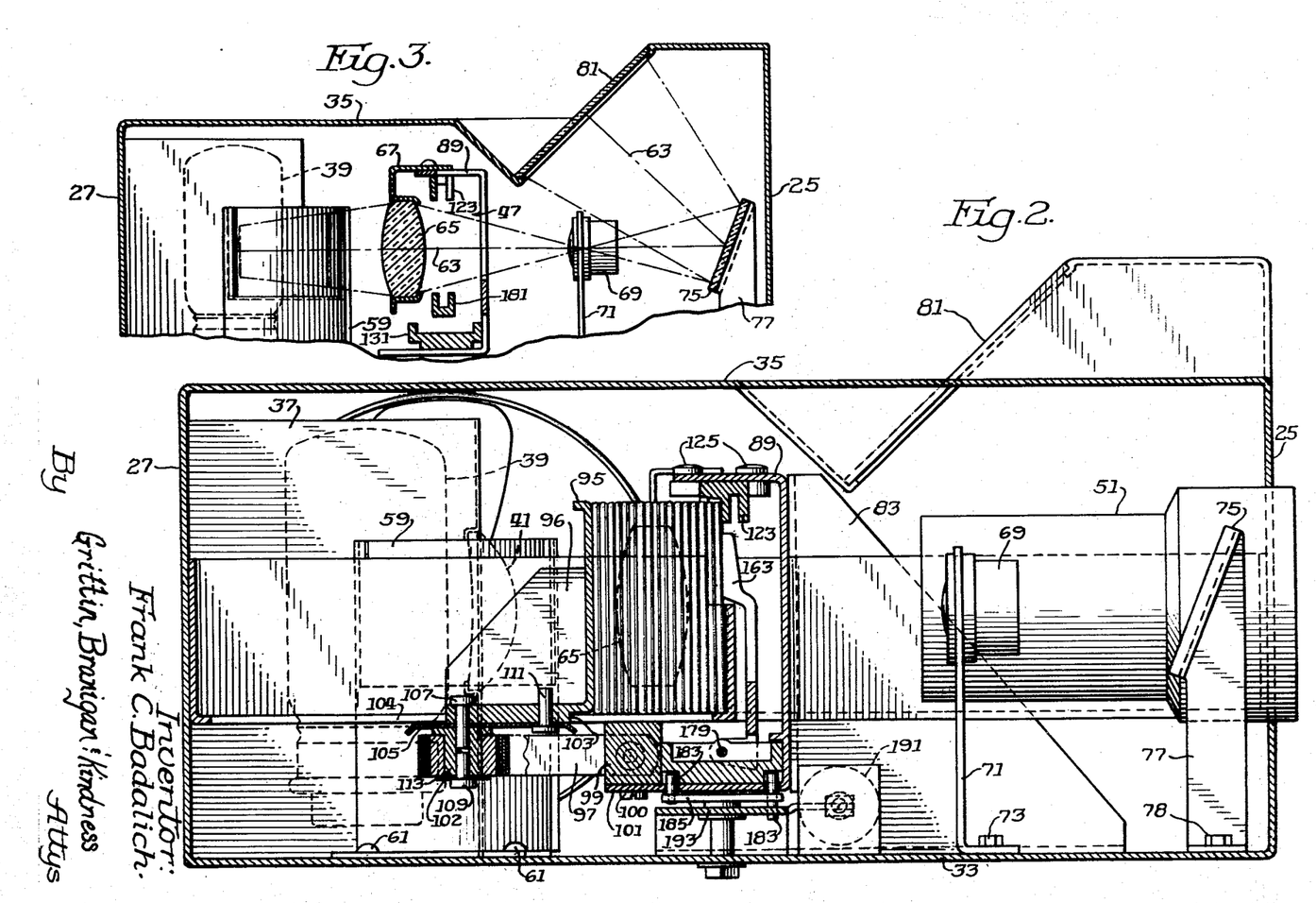
FIG. 2 is a cross-sectional view along line 2—2 of FIG. 1.
FIG. 3 is a cross-sectional view along line 3—3 of FIG. 1.

The negator spring 97 is best illustrated in FIG. 2 and is formed of a flat coiled spring element that is attached to a support member 99. The support member is attached by a bolt 100 to the lower leg 101 of the generally U-shaped slide transfer mechanism frame 89. The other end of the negator spring 97 is wrapped around a core element 102. Each slide pressure pad includes a rib 103 that projects through a slot 104 in the supply and storage magazines 91 and 93. The core element 102 is in the shape of a spool and is fixedly attached to a first pin 107 that passes through the rib 103. A plate member 105 lies between the lower surface of the supply and storage magazines and the core element 102. A second pin 109 presses a washer 113 against the lower side of the core element 102. A third pin 111 also passes upwardly through the plate 105 into the rib 103 so that alignment is maintained. When the coiled spring is uncoiled by the insertion of slides before the pressure pads, it moves the spool and its attached pressure pad toward the support member 99 which movement creates pressure against those slides.

Figure 4:
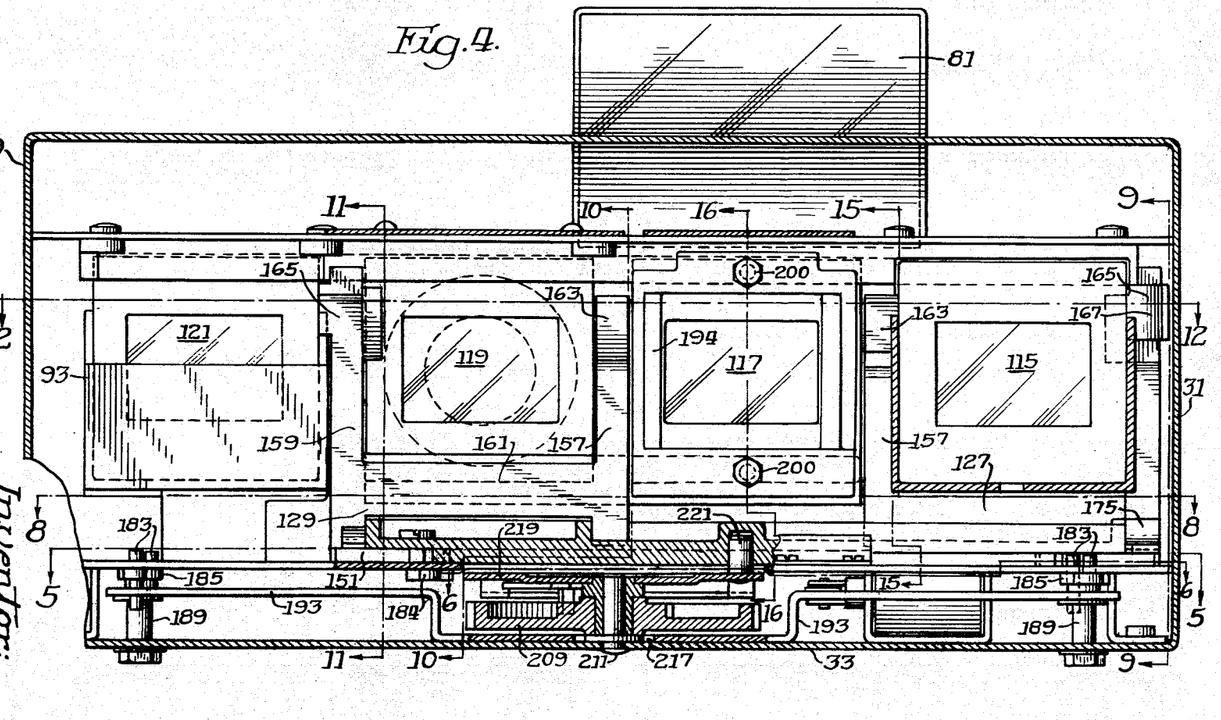
FIG. 4 is a cross-sectional view along line 4—4 of FIG. 1.
Figures 13, 14, 15, 16:
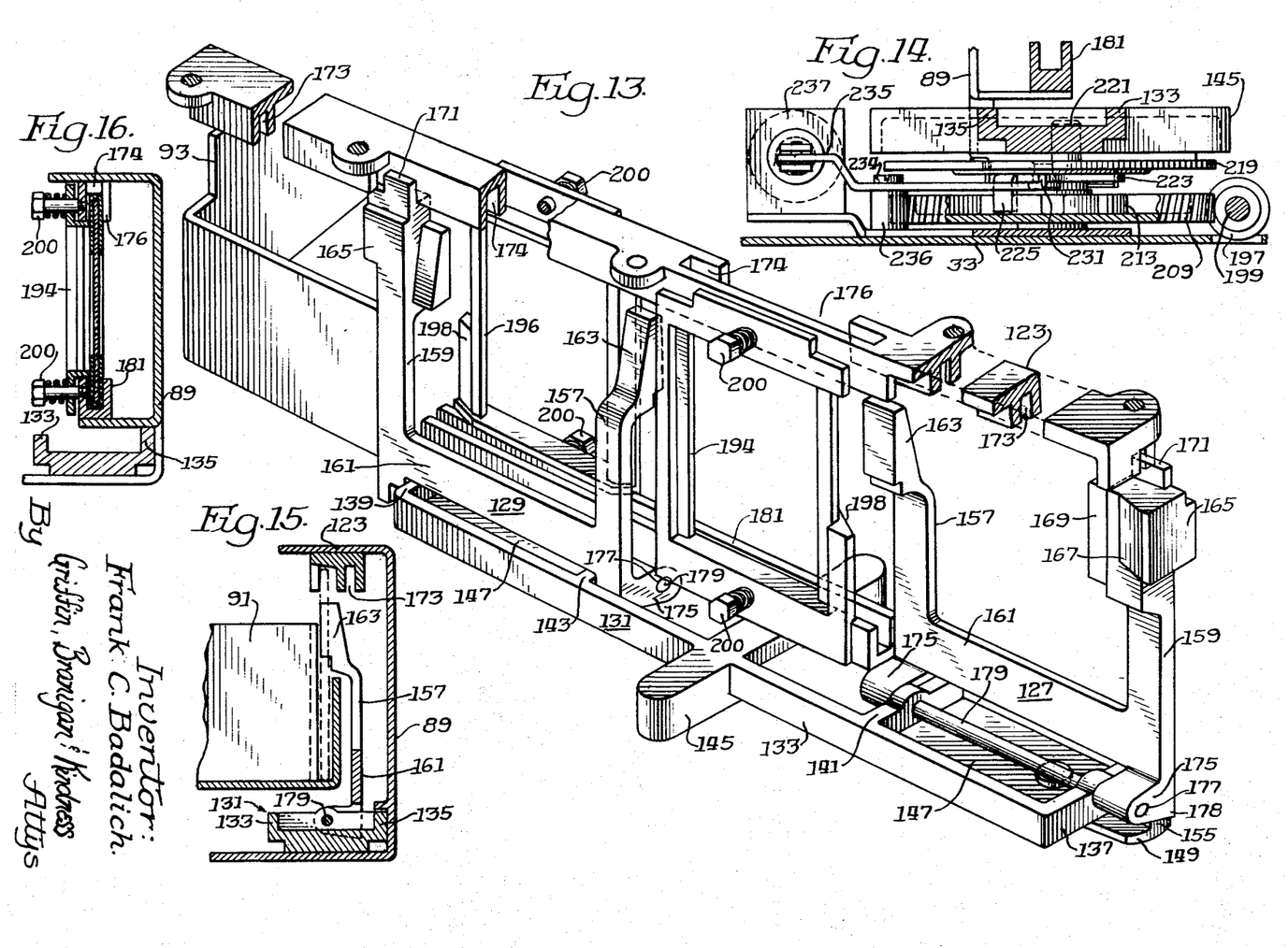
FIG. 13 is an enlarged perspective view of a portion of the slide transfer mechanism of the invention.
FIG. 14 is a cross-sectional view along line 14—14 of FIG. 6.
FIG. 15 is a cross-sectional view along line 15—15 of FIG. 4.
FIG. 16 is a cross-sectional view along line 16—16 of FIG. 4.

While the invention will operate in either a forward or a reverse direction, the normal or forward movement is from a slide supply position 115, through a slide preview position 117 and a slide projection position 119, to a slide storage position 121, or from right to left as viewed in FIG. 4. The mechanism for moving the slides through the four positions is best illustrated in FIG. 13. The slide transfer mechanism comprises an upper rail 123 having a generally flat upper surface that is attached beneath the upper side of the slide transfer mechanism frame 89 by a plurality of bolts 125 (FIG. 2). The slide transfer mechanism also includes a slide supply yoke 127 and a slide storage yoke 129. As hereinafter described, the slide supply yoke moves from the slide supply position 115 to the slide preview position 117 and vice versa. The slide storage yoke moves from the slide projection position 119 to the slide storage position 121 and vice versa.

The slide transfer mechanism further includes a slide transfer frame 131. The slide transfer frame 131 includes a relatively long pair of outside rails 133 and 135 (FIGS. 12A and 12B) closed by a pair of end rails 137 and 139. A pair of inner rails 141 and 143 mounted parallel to the end rails 137 and 139 intersect the side rails 133 and 135. A slotted rail 145, longer than the end or inner rails and having a slot in its lower side, bisects the outside rails 133 and 135. As hereinafter described, the slotted rail 145, acts in conjunction with a pin to cause the slide transfer frame 131 to move back and forth or from left to right and vice versa as viewed in FIGS. 12A and 12B.

The slide transfer frame 131 is enclosed by a floor 147 so that a box like structure is formed. Preferably, the portion of the slide transfer mechanism comprised of the various rails and the floors is formed as a unitary structure.

Figure 5:
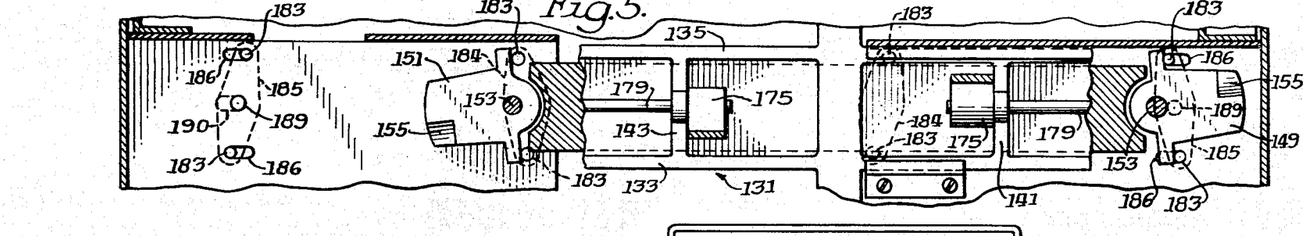
FIG. 5 is a cross-sectional view along line 5—5 of FIG. 4.

Mounted beneath the floor 147 and projection outwardly from either side of the slide transfer frame 131 are a pair of rotatable cams 149 and 151 (FIG. 5),). The right cam 149, as viewed in FIG. 5, is a supply cam and the left cam 151 is a storage cam. The supply and storage cams 149 and 151 are pivotally attached to the floor 147 by pins 153. Each cam includes an upwardly projecting face cam 155 that is adapted to impinge on either the supply yoke 127 or the storage yoke 129, in the manner hereinafter described.

Figure 10:
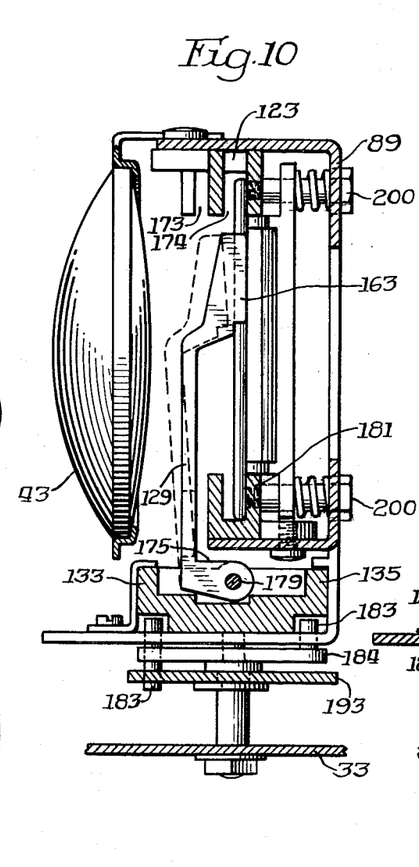
FIG. 10 is a cross-sectional view along line 10—10 of FIG. 4.
Figure 12A:
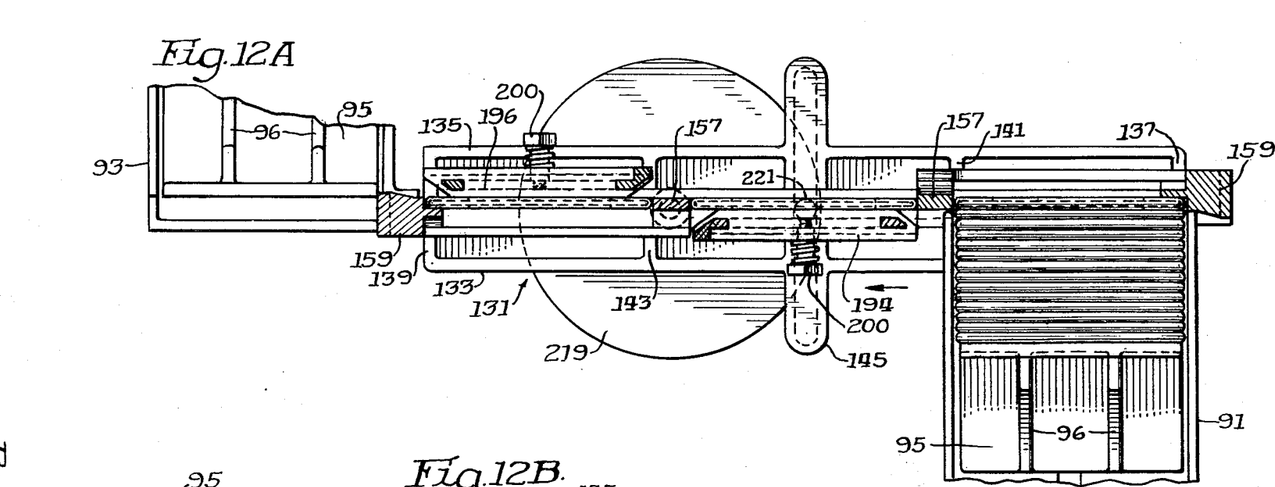
FIGS. 12A and 12B are cross-sectional views along line 12—12 of FIG. 4 for different positions of the slide transfer mechanism.
Figure 12B:
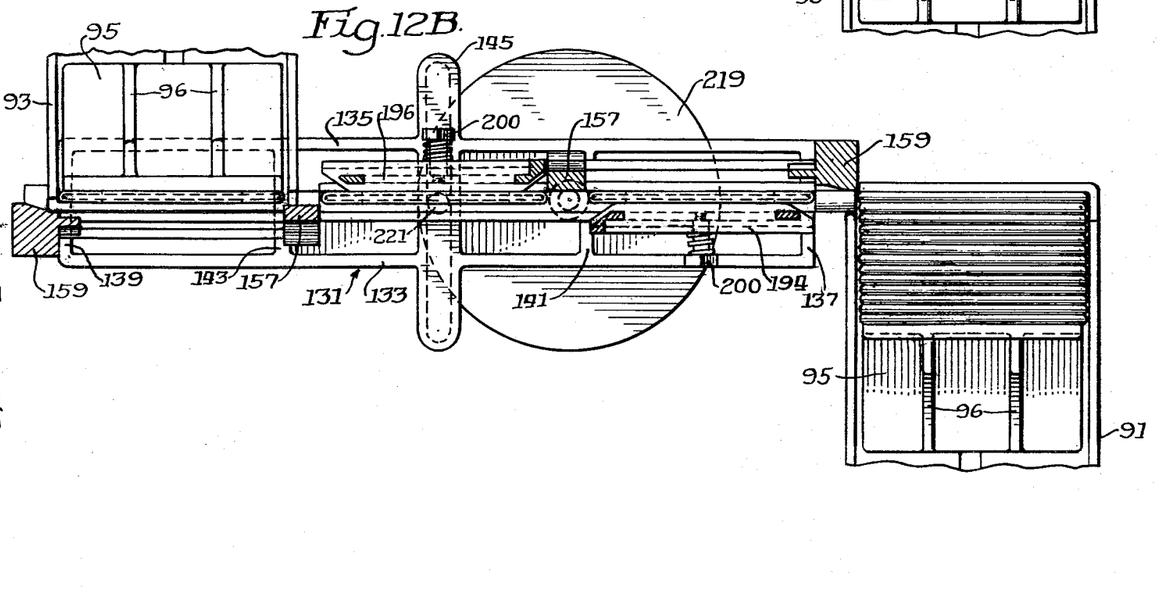

Each yoke (FIG. 13) is generally U-shaped and comprises an inside leg 157, an outside leg 159, and a cross member 161. The inside leg 157 has an inwardly projecting region 163 that projects toward the slide in its respective slide magazine (either the supply magazine or the storage magazine, as the case may be). The inside surface of the inwardly projecting region 163 is adapted to fit against the inside edge of a slide as illustrated in FIG. 10 when the yoke holds or moves a slide in the manner hereinafter described. The outside leg 159 also includes an inwardly projecting region 165. The inwardly projecting region 165 of the outside leg 159 includes an angulated cam face 167 and a notch 169. The notch 169 is adapted to fit about the outside edge of a slide as illustrated in FIG. 12. The cam 167 is adapted to move the remaining slides in a magazine away from the yokes when a slide is moved from the supply magazine to the preview station or from the projection station to the storage magazine. Scratching of the slides by the yoke is prevented because the cam 167 impinges on the frames of the slides and not on the image surface of the slides.

The inwardly projecting region 165 of the outer leg 159 also includes an upwardly projecting finger 171. The upwardly projecting finger 171 fits into an inverted U-shaped side region 173 formed in the upper rail 123 best illustrated in FIG. 13. One inverted U-shaped side region is formed on one side of the upper rail 123 and another inverted U-shaped side region is formed on the other side of the upper rail 123. The two U-shaped side regions 173 are located on opposite ends of the upper rail 123, and are approximately the length of the distance between the inner and outer legs 157 and 159 of the supply and storage yokes 127 and 129. Located between the outer U-shaped regions 173 is an inner U-shaped region 174 through which the upper portion of a slide frame passes (FIG. 16). An aperture 176 is formed in the upper rail 123 above the preview station 117 to allow a single slide to be removed for orientation correction. This aperture 176 also allows a slide to be inserted into a series and provides for single slide projection.

Located beneath each leg and formed as an integral part of each yoke is a flange 175. Each flange projects inwardly and includes an aperture 177 having an axis that is parallel with the cross member 161 of the yoke. The apertures 177 of the two flanges 175 of each yoke are axially aligned. Apertures are also formed in each inner rail 141 and each end rail 137 of the slide transfer frame 131. The two flanges 175 of each yoke fit outside an end and an inner rail with one yoke being on one end of the frame and the other yoke being on the other end of the frame.

Pins 179 pass through the apertures in the end and inner rails and the apertures in the yoke flanges 175 so that the yokes are rotatable with respect to the slide transfer frame 131 as illustrated in FIG. 13. Preferably, springs (not shown) are included to rotate the yokes about the pins 179 away from their respective supply and storage magazines. The outer flange 175 of each yoke includes a cam follower portion 178 that rides on the cam face 155 of the supply and storage cams 149 and 151. The interaction between the cam followers and the face cams is such that when the supply and storage cams are in suitable positions, they rotate the yokes toward their respective supply and storage magazines.

Located between the supply and storage magazines is a U-shaped trough 181. The U-shaped trough 181 is adapted to hold the lower portion of the frames of the slides when the slides are in the slide preview station 117 and the slide projection station 119. The U-shaped trough 181 and the inner inverted U-shaped region 174 of the upper rail 123 cooperates to hold slides in a substantially vertical plane.

Figures 6, 7:
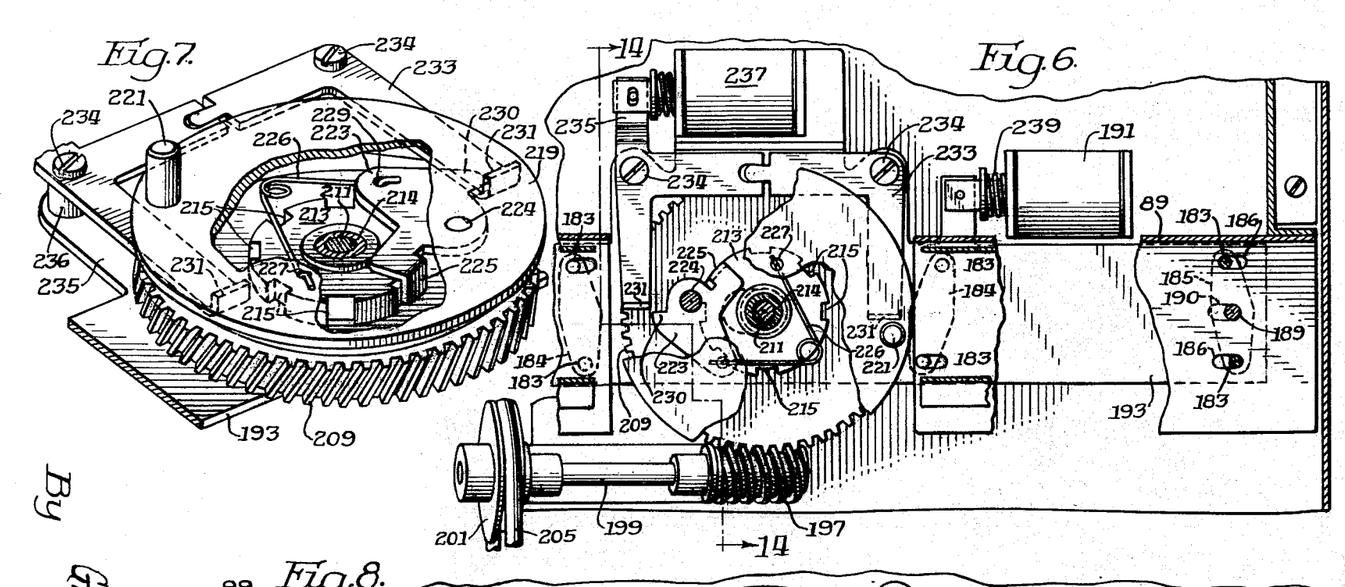
FIG. 6 is a cross-sectional view along line 6—6 of FIG. 4.
FIG. 7 is a perspective view, partially in section, of a portion of the slide transfer mechanism of the invention.
Figure 8:
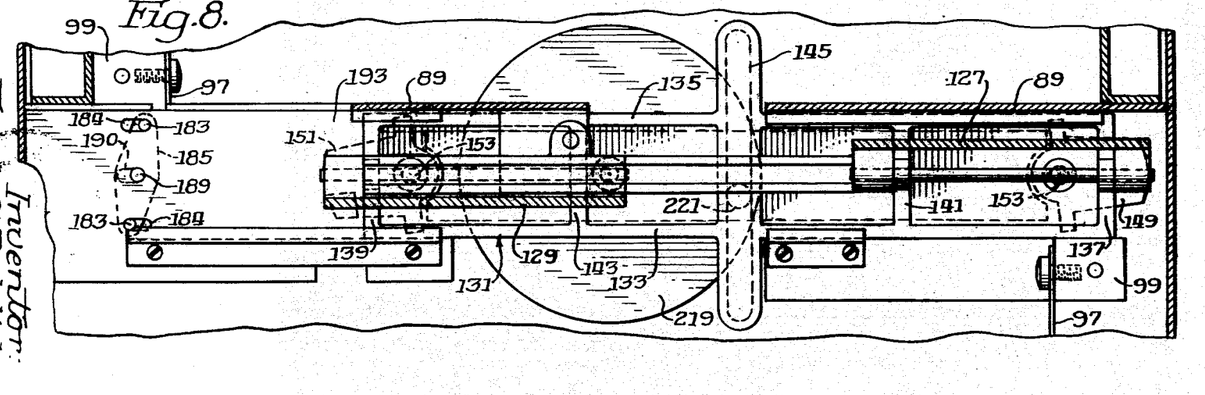
FIG. 8 is a cross-sectional view along line 8—8 of FIG. 4.

The supply and storage cams 149 and 151 are rotated about their respective pins 153 by four pairs of control pins 183 (FIG. 5). The control pins 183 are mounted on the outer ends of inner and outer lever arms 184 and 185 and project upwardly through apertures 186 in the lower side of the slide transfer mechanism frame 89 as illustrated in FIGS. 4 and 6. The inner lever arms 184 are located adjacent the outer edges of the slide preview and projection positions 117 and 119. The outer lever arms 185 are located adjacent the outer edges of the slide supply and storage positions 115 and 121. By this location arrangement, the inner lever arms control yoke rotation at the slide preview and projection positions and the outer lever arms control yoke rotation at the slide supply and storage positions, in the manner hereinafter described.

The inner and outer lever arms 185 are rotatably attached by pins 189 that pass through slots 190 in a control plate 193. The position of the pins is determined by the right or left position of the control plate 193 as viewed in FIG. 6, and the position of the control plate is determined by the energization of a forward-reverse relay 191. That is, the armature of the forward reverse relay 191 is connected to the control plate 193 so as to move the control plate and attached control pins 183 to the right or left. When the plate is moved in one direction, one of the control pins 183 of each pair moves inward and the other moves outward. Reversing the direction of movement the control plate 193 moves the formerly outer control pin inward and the formerly inner control pin outward. The pins coact with the lateral projecting regions 195 formed in the ends of the supply and storage cams 149 and 151, so as to rotate the supply and storage cams 149 cams 149 and 151, so as to rotate the supply and storage cams 149 about their respective pins 153 as the yokes are moved back and forth in the hereinafter described manner.

As the face 155 of the supply and storage cams 149 are rotated, they interact with the cam follower portions 178 of the supply and storage yokes 127 and 129. This interaction moves the supply and storage yokes toward or away from the supply and storage magazines for purposes hereinafter described.

In order to maintain vertical alignment of slides in the preview and projection positions, preview and projection pressure plates 194 and 196 (FIGS. 13 and 16) are provided. The preview and projection pressure plates are generally rectangular shaped frame structures having outer cammed edges 198 to provide easy slide egress. One pressure plate is mounted on one side of the U-shaped trough 181 and the other pressure plate is mounted on the other side of the U-shaped trough. The pressure plates are attached to the U-shaped trough 181 and the upper rail 123 by spring loaded bolts 200 which pressure the pressure plates toward the U-shaped trough and the upper rail.

The slide transfer frame 131 is moved back and forth by the operation of a slide movement mechanism best illustrated in FIGS. 6 and 7. The slide movement mechanism includes a worm 197 mounted on one end of a shaft 199. A pulley 201 is mounted on the other end of the shaft and is connected to a motor 203 (FIG. 1) by a belt 205. The motor 203 also drives a fan 207 to provide cooling for the projector.

The worm 197 interacts with a gear 209 mounted in a horizontal plane about a vertical shaft 211. As illustrated in FIG. 4, the shaft is non-rotatably attached to the base 33. An indexing collar 213 having a plurality of outer notches 215 is mounted on the shaft 211 above the gear 209. The indexing collar is fixedly attached to, or formed as a unitary member of the gear 209. A bearing 214 is mounted between the shaft 211, and the gear 209 and the indexing collar 213. The shaft 211 passes through an oval aperture 217 in the control plate 193. The aperture 217 is located beneath the gear 209. Hence, the control plate 193 can slide back and forth with respect to the shaft 211 and its associated components when the forward-reverse relay 191 is energized and de-energized.

Mounted above the indexing collar 213 on the shaft 211 is a cylindrical plate 219. The cylindrical plate 219 has an upwardly projecting pin 221 that fits into the slot in the slotted rail 145 formed in the slide transfer frame 131 (FIG. 13). Rotatably attached to the lower side of the cylindrical plate 219 is a generally triangular shaped control element 223. The control element has a downwardly projecting region 225 that interacts with the notches 215 in the indexing collar 213. One end of a wire spring 226 having a single coil passes through an aperture 227 in the cylindrical plate 219. The other end of the wire spring 226 passes through an aperture 229 in the generally triangular shaped control element 223. The generally triangular shaped control element is also rotatably attached to the cylindrical plate 219 by a pin 224. The generally triangular shaped control element 223 and the wire spring 226 are formed and mounted so that the generally triangular shaped control can be moved between either of two positions, one position being such that the downwardly projecting member 225 is located in a notch 215 and the other position being such that the downwardly projecting member 225 is not located in a notch 215.

The generally triangular shaped control element 223 also has an outwardly projecting portion 230 adapted to be acted on by upwardly projecting portions 231 formed in a pair of right angle arms 233 and 235 (FIGS. 6 and 7). The right angle arms 233 and 235 are pivotally connected at their junctions to the control plate 193 via bolts 234 and cylindrical separators 236. The right, right angle arm as viewed in FIG. 7 has an outwardly projecting region that fits into an aperture in the left, right angle arm. In addition, the right, right angle arm 223 has an outwardly projecting element that is connected to the armature of a control relay 237. When the control relay 237 is energized, the right angle arms 233 and 235 rotate about their pivotal points. This rotation moves one or the other of the upwardly projecting elements 231 out of contact with the outwardly projecting portion 230 of the generally triangular shaped control element. This co-action rotates the generally triangular member 223 about its pin 224 to move its downwardly projecting member 225 into one of the notches 115 in the collar 213. Which one of the two upwardly projecting elements 231 of the right angle arms interacts with the outwardly projecting element 229 of the generally triangular member 223 depends upon whether or not the forward-reverse relay 191 is energized. That is, if the control plate 193 is located in its right position as viewed in FIG. 6, the upwardly projecting element 231 of the left, right angle arm 233 coacts with the triangular control element 223. Conversely, if the control plate 193 is located in its left position as viewed in FIG. 6 the upwardly projecting element of the right, right angle arm coacts with the triangular shaped control element.

Turning now to a description of the operation of the slide movement mechanism heretofor described; assuming initially that the slide movement mechanism is going to move slides in a forward direction (i.e., from the slide supply magazine 91 to the slide storage magazine 93), the forward-reverse relay is not energized. Because it is not energized, a coil spring 239 (FIG. 6) wound about the armature of that relay moves the control plate 193 to its leftmost position. This position of the control plate is illustrated in FIG. 7. In this position, as previously described, the upwardly projecting element 231 of the right, right angle arm 235 coacts with the outwardly projecting portion 230 of the generally triangular shaped control element 223 to rotate the triangular shaped element about its pin 224 and move the downwardly projecting member out of the notches 215. When the control relay 237 is energized and the upwardly projecting portion 231 of the right, right angle arm 235 moves away from the outwardly projecting portion 230 of the generally triangular shaped element 223, the generally triangular shaped element 223 is then rotated about its attachment pin 224 by the wire spring 226 so that its downwardly projecting member 225 is moved into one of the notches 215 in the indexing collar 213. When this action occurs, the pin 221 is rotated through 360° by the cylindrical plate 219 because the cylindrical plate 219 is now connected to the gear 209. The rotation stops at 360° because the outwardly projecting portion 230 of the generally triangular shaped element 223 again contacts the upwardly projecting element 231 of the right, right angle arm 235 to rotate the generally triangular shaped element and move the downwardly projecting member 225 out of the notch 215.

It will be appreciated from the foregoing description that the movement of the downwardly projecting member 225 into and out of the notches 215 provides coupling between the power applied to the gear 209, and the cylindrical plate 219 and its attached pin 221. Hence, after connection, as the gear 209 revolves, the cylindrical plate 219 also revolves. This revolving movement causes the slide transfer frame 231 to move first to the left and then to the right as viewed in the FIGURES because the pin 221 is in the slot in the slotted rail 145. This action continues until a complete revolution occurs, at which point the outwardly projecting portion 230 of the generally triangular shaped element 223 again intersects the upwardly projecting portion 231 of the right, right angle arm 235. Unless, of course, the control relay has been continuously energized. If so, a second revolution occurs. In this manner, the rotary motion of the motor is converted into reciprocal slide transfer frame motion.

The foregoing description has described how the slide transfer frame moves reciprocally back and forth, the following description sets forth how the slide supply and slide storage yokes 127 and 129 are moved into and out of engagement with the slides in the slide supply and slide storage magazines. This movement is controlled by the interaction of the supply and storage cam elements 149 and 151 and the cam faces 178 of the slide supply and slide storage yokes 157 and 159. Specifically, because the forward-reverse relay is unenergized, the control plate 193 is in the position illustrated in FIG. 6. Because it is in this position, the pins 183 are in the positions illustrated in FIGS. 5 and 6. That is, the pins 183 of the right outer lever arm 185, as viewed in FIG. 5, rotate the supply cam 149 in a counter-clockwise direction while the pins of the right inner lever arm 184 rotate the supply cam in a clockwise direction. Because of this cam movement, the suppy yoke 127 is rotated toward a slide when the supply yoke is at the supply position 115 and away from a slide when the supply yoke is at the slide preview position 117. On the opposite side of the projector, the pins of the left outer lever arm 185 rotate the storage cam 151 in a clockwise direction while the pins of the inner lever arm 184 rotate the storage cam in a counter-clockwise direction. Because of this cam movement, the storage yoke 129 is rotated toward a slide when the storage yoke is at the projection position 119 and away from the slide when the storage yoke is at the storage position 121.

Figure 9:
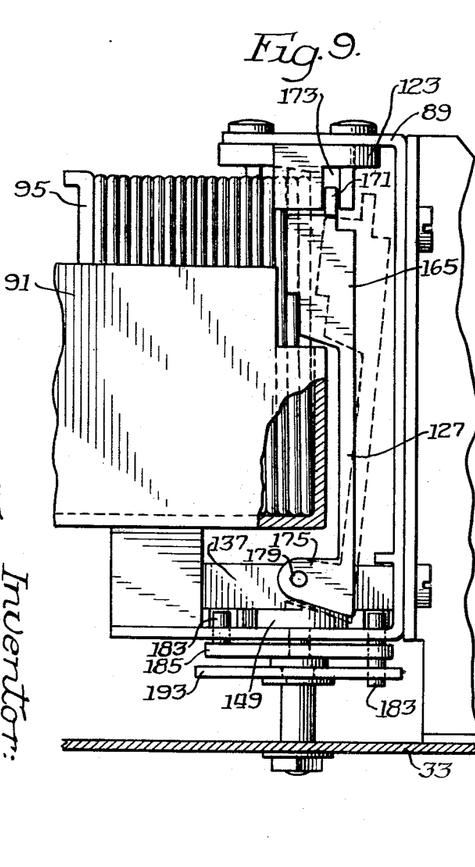
FIG. 9 is a cross-sectional view along line 9—9 of FIG. 4.

Because of the just described pin-cam operation, the slide supply cam 149 is rotated in a counter-clockwise direction as the slide transfer frame 131 reaches the end of its path of travel to the right. This movement causes the face cam 155 to impinge on the downwardly projecting portion of the slide supply yoke 127 thereby rotating the slide supply yoke toward the supply magazine 91. This rotation action is best illustrated in FIG. 9 as being from the dotted line to the solid line positions. The movement is such that the slide supply yoke 127 engages a slide between the notch 169 and the inner side of the inwardly projecting region 163 of the inside leg 157 of that yoke. This engagement is best illustrated in FIG. 12. At the same time and in the same manner, the storage yoke is moved into engagement with a slide at the slide projection position.

Figure 11:
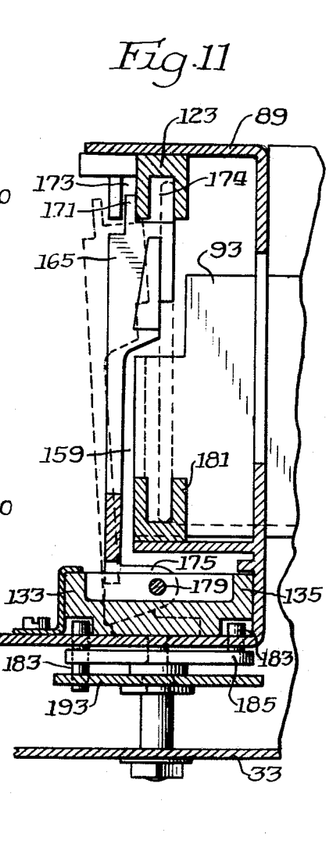
FIG. 11 is a cross-sectional view along line 11—11 of FIG. 4.

At this point, both the slide supply yoke and the slide storage yokes have moved into engagement with slides — the slide supply yoke with the next slide in the slide supply magazine and the slide storage yoke with the slide at the projection station. As the gear 209 continues to revolve, the pin moves in the slotted rail and, hence, the slide transfer frame 131 moves to the left as viewed in the drawings. As this movemenet begins, the upwardly projecting finger 171 of the slide supply and slide storage yokes move into the inverted U-shaped slide regions 173 in the upper rail 123. The movement to the left continues until the slide storage yoke is in front of the slide storage magazine and the slide supply yoke is in front of the preview station 117. At this point, the supply cam impinges on the pins 183 of the right inner lever arm. This impingement causes the face cam 155 to rotate in a clockwise direction and allows the slide supply yoke 129 to move away from the slide that the slide supply yoke has moved to the preview position. In a similar manner, the storage yoke is moved away from the slide it has moved to the storage position. This latter movement is illustrated in FIG. 11 as the movement of the slide storage yoke from a solid line position to a dotted line position. It should be noted that the upwardly extending fingers 171 of the yokes do not prevent rotation because the upwardly projecting fingers 171 are beyond the end of the inverted U-shaped side regions 173 when the yokes are rotated.

When the control relay 237 is again energized, the foregoing cycle is repeated and the slide now in the slide preview station 117 moves to the slide projection station. The slide in the slide projection station moves to the storage magazine and a slide from the supply magazine moves to the slide preview station 117.

When reverse movement is desired, the forward-reverse relay 191 is energized. This energization moves the control plate 193 to its rightmost position. When this occurs, all of the pins reverse their former positions and the left, right angle arm 233 impinges on the outwardly projecting portion 230 of the triangular shaped control element 223. This shift is essentially a 180° shift so that when the slide storage yoke is in front of the storage magazine, it picks up rather than disposes of a slide. Conversely, when the slide supply yoke 127 is in front of the supply magazine, it drops off, rather than picks up, a slide. Other than these changes, the reverse operation is identical to the forward operation, hence, it will not be further discussed here.

It will be appreciated from the foregoing description that the invention provides a rather uncomplicated and, therefore, reliable mechanism for moving slides through a slide projector. While a preferred embodiment of the invention has been described and illustrated, it will be appreciated that various changes may be made without departing from the general scope of the invention.

The embodiments of the invention in which an exclusive property or privilege is claimed are defined as follows:

1. A slide projector comprising:
   projection means for projecting slides, said projection means defining a projection axis;
   a supply magazine located on one side of said projection axis for supplying slides;

a storage magazine located on the other side of said projection axis from said supply magazine for storing slides; and, a slide movement means for moving slides in a generally vertical plane through said projection axis from one of said magazines to the other of said magazines in a sequential manner so that slides are projected by said projection means when they intersect said projection axis, said slide movement means including:

i. a supply yoke for engaging and moving a slide into or out of said suppy magazine and toward or away from said projection axis in a predetermined manner, said supply yoke including means for pressing the second and subsequent slides in said suppy magazine away from said supply yoke when a slide is moved into or out of said supply magazine;

ii. a storage yoke for engaging and moving a slide into or out of said storage magazine and toward or away from said projection axis in a predetermined manner, said storage yoke including means for pressing the second and sub-sequent slides in said storage magazine away from said storage yoke when a slide is moved into or out of said storage magazine;

iii. yoke control means operatively connected to said supply and storage yokes for moving said supply and storage yokes such that their means for pressing are moved into and out of engagement with the second slide in said supply and storage magazines, respectively; and, iv. transfer means operatively connected to said supply and storage yokes for moving said supply and storage yokes back and forth at right angles to said projection axis so that slides are moved through said projection axis as said supply and storage yokes are moved back and forth by said transfer means, and for moving said supply and storage yokes such that their said means for pressing are moved into and out of engagement when said second slides by said yoke control means as the supply and storage yokes move a slide into or out of said supply and storage magazines.

2. A slide projector as claimed in claim 1 wherein said transfer means includes a generally rectangular slide transfer frame located beneath said projection axis and adapted to reciprocate back and forth beneath said generally vertical plane through which said slides move, said supply and storage yokes being rotatably mounted adjacent to the ends of said slide transfer frame.

3. A slide projector as claimed in claim 2 wherein said yoke control means comprises;

supply and storage cams rotatably attached to said slide transfer frame beneath said slide trans-fer frame so as to project outwardly there-from;

a control mechanism for selectively rotating said supply and storage cams between two positions in a pre-determined manner; and, cam faces formed in said supply and storage yokes adjacent to said supply and storage cams so that when said supply and storage cams are selectively rotated back and forth between said two positions by said control means, said supply and storage yokes are rotated into and out of engagement with said slides.

4. A slide projector as claimed in claim 3 wherein said slide transfer frame includes a rail mounted at right angles to the direction that said slide transfer reciprocates, said rail having a slot in its lower surface; and, wherein said slide movement means further comprises a cylindrical plate and a rotatable pin mounted on said cylindrical plate, said pin projecting into said slot in said rail so that the rotational movement of said pin is changed into reciprocating movement of said rail and said frame when said cylindrical plate is rotated, and a driving means for rotating said cylindrical plate.

5. A slide projector as claimed in claim 4 wherein said driving means includes a notched indexing collar mounted on a shaft and coupling means for coupling said notched indexing collar to said cylindrical plate so as to cause intermittent rotational movement of said cylindrical plate and said pin.

6. A slide projector as claimed in claim 5 wherein said coupling means includes:

a relay;

an arm having an upwardly projecting portion, said arm being operatively connected to said relay so as to be moved when said relay is energized; and, a generally triangular shaped control element rotatably mounted on said cylindrical plate, said triangular shaped control element having an outwardly projecting portion formed so as to coact with said upwardly projecting portion of said arm, and a downwardly projecting portion adapted to fit into said notches in said indexing collar when said upwardly projecting portion of said arm coacts with said outwardly projecting portion of said generally triangular shaped control element, said action occuring when said relay is energized.

7. A slide projector as claimed in claim 6 wherein said cam control mechanism includes a forward-reverse relay operatively connected to said supply and storage cams so as to cause said supply and storage cams to rotate, whereby said supply and storage yokes are rotated.

8. A slide projector as claimed in claim 7 wherein said driving means also includes a gear mounted on said shaft and coupled to said indexing collar and and a motor operatively connected to said gear for continuously rotating said gear.

9. A slide projector as claimed in claim 8 wherein said coupling means also includes a second arm having an upwardly projecting portion operatively connected to said first arm, said first and second arms being mounted on opposite sides of said indexing collar so that their upwardly projecting por-tions coact with the outwardly projecting portion of said generally triangular shaped control element.

10. A slide projector as claimed in claim 9 wherein said cam control mechanism also includes a control plate and rotatable lever arms mounted on said control plate, said rotatable lever arms having pins that interact with out-wardly projecting portions of said supply and storage cams, said interaction causing said supply and storage cams to rotate into one of said two positions, said control plate being attached to said forward-reverse relay so that said control plate and said lever arms form a coupling between said forward-reverse relay and said supply and storage cams.

11. A slide projector as claimed in claim 10 wherein said slide projector has supply, preview, projection and storage posi-tions, said supply yoke being moveable between said supply and preview positions and said storage yoke being moveable between said projection and storage positions.

12. A slide projector as claimed in claim 11 wherein said lever arms are four in number, the first lever arm being adjacent said supply position, the second lever arm being adjacent said preview position, the third lever arm being adjacent to said pro-jection position, and the fourth lever arm being adjacent to said storage position, said lever arms being moveable by said control plate into forward and reverse positions.

13. A slide projector as claimed in claim 1 wherein said slide projector has supply, preview, projection and storage positions, said supply yoke being moveable between said supply and preview positions and said storage yoke being moveable between said projection and storage positions.

14. A slide movement mechanism for moving slides from a first slide magazine to a second slide magazine and vice versa comprising:
a first yoke for engaging and moving a slide into or out of said first magazine, said first yoke including means for pressing the second and subsequent slides in said first magazine away from said first yoke when a slide is moved into or out of said first magazine;
a second yoke for engaging and moving a slide into or out of said second magazine, said second yoke including means for pressing the second and subsequent slides in said second magazine away from said second yoke when a slide is moved into or out of said second magazine;
yoke control means operatively connected to said first and second yokes for moving said first and second yokes such that their means for pressing are moved into and out of engagement with the second slide in said first and second magazines, respectively; and,
transfer means operatively connected to said first and second yokes for moving said first and second yokes back and forth at right angles to said direction of yoke movement caused by said yoke control means so that said first and second yokes are moved back and forth by said transfer means, and for moving said first and second yokes such that their said means for pressing are moved into and out of engagement with said second slides by said yoke control means as the first and second yokes move a slide into or out of said supply and storage magazines.

15. A slide movement mechanism claimed in claim 14 wherein said transfer means includes a generally rectangular slide transfer frame adapted to reciprocate back and forth in a path beneath said first and second magazines, said first and second yokes being rotatably mounted adjacent to the ends of said slide transfer frame.

16. A slide movement mechanism as claimed in claim 15 wherein said yoke control means comprises;
first and second cams rotatably attached to said slide transfer frame beneath said slide transfer frame so as to project out-wardly therefrom;
a control mechanism for selectively rotating said first and second cams between two positions in a predetermined manner; and,
cam faces formed in said first and second yokes adjacent to said first and second cams so that when said first and second cams are selectively rotated back and forth between said two positions by said control means, said first and second yokes are rotated into and out of engagement with said slides.

17. A slide movement mechanism as claimed in claim 16 wherein said slide transfer frame includes a rail mounted at right angles to the direction that said slide transfer frame reciprocates, said rail having a slot in its lower surface; and, wherein said slide movement means further comprises a cylindrical plate and a rotatable pin mounted on said cylindrical plate, said pin projecting into said slot in said rail so that the rotational movement of said pin is changed into reciprocating movement of said rail and said frame when said cylindrical plate is rotated, and a driving means for rotating said cylindrical plate.

18. A slide movement mechanism as claimed in claim 17 wherein said driving means includes a notched indexing collar mounted on a shaft and coupling means for coupling said notched indexing collar to said cylindrical plate so as to cause intermittent rotational movement of said cylindrical plate and said pin.

19. A slide movement mechanism as claimed in claim 18 wherein said coupling means includes:
a relay;
an arm having an upwardly projecting portion, said arm being operatively connected to said relay so as to be moved when said relay is energized; and,
a generally triangular shaped control element rotatably mounted on said cylindrical plate, said triangular shaped control element having an outwardly projecting portion formed so as to coact with said upwardly projecting portion of said arm, and a downwardly projecting portion adapted to fit into said notches in said indexing collar when said upwardly projecting portion of said arm coacts with said outwardly projecting portion of said generally triangular shaped control, said action occuring when said relay is energized.

20. A slide movement mechanism as claimed in claim 19 wherein said cam control mechanism includes a forward-reverse relay operatively connected to said first and second cams so as to cause said first and second cams to rotate, whereby said first and second yokes are rotated.

21. A slide movement mechanism as claimed in claim 20 wherein said driving means also includes a gear mounted on said shaft and coupled to said indexing collar and a motor operatively connected to said gear for continuously rotating said gear.

22. A slide movement mechanism as claimed in claim 21 wherein said coupling means also includes a second arm having an upwardly projecting portion operatively connected to said first arm, said first and second arms being mounted on opposite sides of said indexing collar so that their upwardly projecting portions coact with the outwardly projecting portion of said generally triangular shaped control element.

23. A slide movement mechanism as claimed in claim 22 wherein said cam control mechanism also includes a control plate and rotatable lever arms mounted on said control plate, said rotatable lever arms having pins that interact with outwardly projecting portions of said first and second cams, said interaction causing said first and second cams to rotate into one of said two positions, said control plate being attached to said forward-reverse relay so that said control plate and said lever arms form a coupling between said forward-reverse relay and said first and second cams.

* * * * *